W. PARKER.
Straw Carrier.

No. 76,513. Patented April 7, 1868.

Witnesses.

Inventor.
Wm Parker

United States Patent Office.

WILLIAM PARKER, OF WASHINGTON, OHIO.

Letters Patent No. 76,513, dated April 7, 1868.

IMPROVEMENT IN STRAW-CARRIERS.

*The Schedule referred to in these Letters Patent and making part of the same.*

TO ALL WHOM IT MAY CONCERN:

Be it known that I, WILLIAM PARKER, of Washington, in the county of Guernsey, in the State of Ohio, have invented new and useful Improvements in the Straw-Carrier, or machinery carrying forward and shaking the threshed grain out of the straw; and I do hereby declare that the following is a full, clear, and exact description of the construction and operation of the same, reference being had to the annexed drawings, making a part of this specification, in which—

Figure 1:
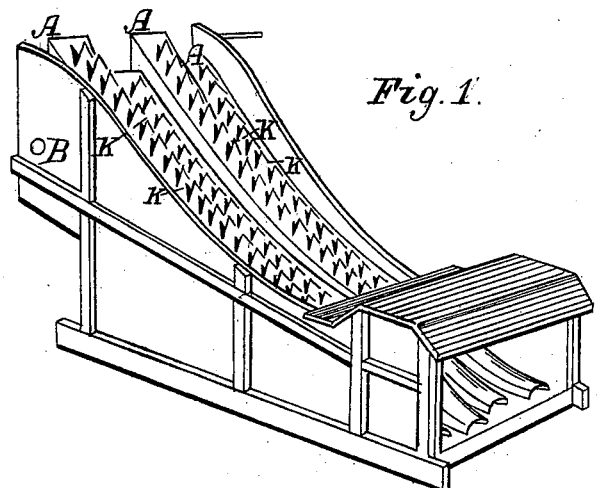

Figure 1 is a perspective view.

Figure 2:
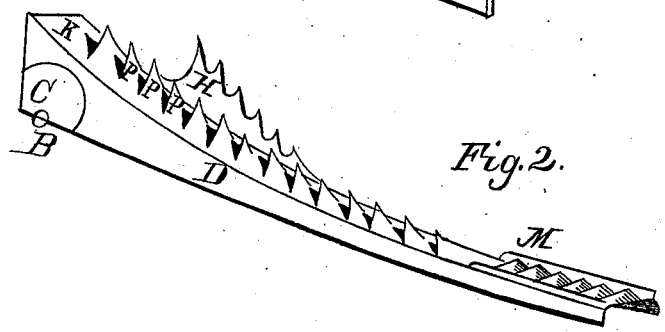

Figure 2, a single open or riddle-like bar, composed of two side-boards, D, and a sheet-iron cover or top, K.

Figure 3:
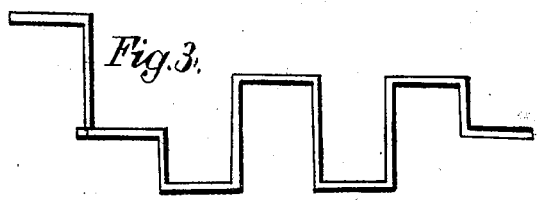

Figure 3, crank-shaft.

To enable others skilled in the art to make and use my invention, I will proceed to describe its construction and operation.

To carry forward and shake the threshed grain out of the straw, I use open or riddle-like bars, A A, instead of the solid bars formerly used, over which the straw passes, and through which the grain riddles.

Said bars A A are curved, as seen in fig. 2, so that the carrier may have the slope at the lower end most favorable to receive the dash of the threshing-cylinder, while the outward end of the carrier may be quite steep, say forty-five degrees, or, by covering the trunk either with a yielding or permanent cover, this carrier would rake the straw out at any desired pitch, and, by lengthening the stroke of the cranks, its capacity to shake and carry forward the straw is increased to any desired extent. The cover K K of said bars A A is sheet iron, cut in the manner of a lip-riddle. The lips P P are V-shaped, the point of the V outward, and turned up, to act as a rake on the straw.

A recess, C, is made in the side of the bars A A, one-half of the thickness of the crank-shaft in each bar A A, to give room for the cranks to rotate. The crank may attach to the bars A A at B, around which point the recess C circles.

To penetrate bunches of straw, the bars A A may be provided with projections or horns, H, placed on one side of the bars, and in pairs side by side on the bars A A, as it requires two horns H working together, but on separate bars, to elevate the straw over said horns. The horns H are saw-tooth shaped, that the straw may not get under them, and toothed on the upper edge, that the straw may not slip on them.

Cleats crossing the bars A A on the lower edge, or the lower edge of side-boards D, being notched, convey the grain inward on trunk-bottom. Trough M on lower end of bars A A conveys the grain outward, having wedge-like cleats across the bottom, as seen in fig. 2.

The lower ends of bars A A may slide on trunk-bottom, or they may terminate in a rod, said rods vibrating through the end of the trunk, or they may swing on rocking-shafts inside of the trunk at the feed-end of the machine.

What I claim as my invention, and desire to secure by Letters Patent, is—

1. A series of open or riddle-like bars, substantially as and for the purpose set forth.
2. A series of bars, operated with one crank-shaft only, substantially as and for the purpose set forth.
3. A series of bars curved, substantially as and for the purpose set forth.
4. A series of bars, provided with horns, substantially as and for the purpose set forth.

WM. PARKER.

Witnesses:
    PHILIP ROSEMAN,
    VANDOLA CRAIG.